(12) United States Patent
Lamat et al.

(10) Patent No.: US 8,662,450 B2
(45) Date of Patent: Mar. 4, 2014

(54) AIRCRAFT OPENING WINDOW AND AIRCRAFT EQUIPPED WITH AT LEAST ONE SUCH WINDOW

(75) Inventors: Luc Lamat, Toulouse (FR); Noel Maurens, Encausse (FR)

(73) Assignee: Airbus Operations S.A.S., Toulouse (FR)

( * ) Notice: Subject to any disclaimer, the term of this patent is extended or adjusted under 35 U.S.C. 154(b) by 258 days.

(21) Appl. No.: 13/110,627

(22) Filed: May 18, 2011

(65) Prior Publication Data

US 2012/0017514 A1 Jan. 26, 2012

(30) Foreign Application Priority Data

May 19, 2010 (FR) ...................................... 10 53866

(51) Int. Cl.
*B64C 1/14* (2006.01)
(52) U.S. Cl.
USPC .......................... 244/129.3; 244/215; 244/231
(58) Field of Classification Search
USPC .................. 244/129.3; 49/231, 215
See application file for complete search history.

(56) References Cited

U.S. PATENT DOCUMENTS

| | | | | |
|---|---|---|---|---|
| 3,050,790 | A | * | 8/1962 | Wakefield ........................ 49/215 |
| 3,585,757 | A | * | 6/1971 | Ritchie et al. .................... 49/215 |
| 5,967,595 | A | * | 10/1999 | Heya et al. ...................... 296/155 |
| 6,328,374 | B1 | * | 12/2001 | Patel ............................. 296/155 |

(Continued)

FOREIGN PATENT DOCUMENTS

| | | |
|---|---|---|
| EP | 0 377 545 A1 | 7/1990 |
| EP | 1 424 278 A1 | 6/2004 |
| FR | 879 567 A | 2/1943 |
| GB | 560 255 | 3/1944 |

OTHER PUBLICATIONS

French Search Report dated Jan. 13, 2011, French Application No. 1053866 filed May 19, 2010, w/English Translation of Categories.

(Continued)

*Primary Examiner* — Tien Dinh
*Assistant Examiner* — Justin Benedik
(74) *Attorney, Agent, or Firm* — Oblon, Spivak, McClelland, Maier & Neustadt, L.L.P.

(57) ABSTRACT

The invention relates to an aircraft opening window comprising at least one pane (2) equipped with a movable frame (3), the assembly comprising the said movable frame (3) and the said at least one pane (2) being movable relative to a fixed frame (1), an element (4) for maneuvering the said movable assembly, a device for locking/unlocking and opening/closing the said movable assembly actuated by the said maneuvering element (4) and means for guiding and supporting the said movable assembly. According to the invention,
the said fixed frame (1) is provided with at least one housing (6, 7, 8) for receiving a part at least of a first lateral rim (5) of the said movable frame (3), the said part at least of the said first lateral rim (5) becoming braced in the said at least one housing (6, 7, 8), by means of which housing or housings the said first lateral rim is held in place when the window is in closed position, and
the said part at least of the first lateral rim being received in the said housing (6, 7, 8), the said guiding means of the said movable assembly permits rotation of the said assembly around an axis of rotation (11) passing through the first lateral rim (5) so as to place the other lateral rim of the said movable frame (3) in closed or released position.

14 Claims, 6 Drawing Sheets

(56) References Cited

U.S. PATENT DOCUMENTS

| | | | |
|---|---|---|---|
| 6,883,755 B2* | 4/2005 | Pautis et al. | 244/129.3 |
| 2003/0178531 A1* | 9/2003 | Hopkins et al. | 244/129.3 |
| 2004/0104306 A1* | 6/2004 | Pautis et al. | 244/129.3 |

OTHER PUBLICATIONS

Written Opinion dated May 19, 2010, French Application No. 1053866 filed May 19, 2010.

* cited by examiner

AIRCRAFT OPENING WINDOW AND AIRCRAFT EQUIPPED WITH AT LEAST ONE SUCH WINDOW

TECHNICAL FIELD

The present invention relates to an aircraft opening window and in particular to a cockpit side window intended to be maneuvered manually by a crew member. The invention is also aimed at an aircraft provided with a pilot station (or cockpit) equipped with at least one such window.

BACKGROUND

Opening side windows for cockpits are known. These windows, which can be maneuvered from inside the aircraft, form openings having very useful functions.

In particular, they constitute emergency exits, ventilation of the cockpit for evacuating smoke in the event of fire, or even provide a simple means of seeing the runway in the event of lack of visibility, for example due to a dirty front window.

There is also known a cockpit window comprising a fixed pane on a rigid frame, itself connected to the structure by a locking mechanism capable of immobilizing the window, relative to the surrounding structure of the aircraft, in open, closed or half-closed position.

All maneuvers of the window can be accomplished with a single handle. Thus, from his seat, the pilot or copilot presses on an unlocking button of the handle, turns it then pulls it backward to retract the opening assembly formed by the pane, its rigid frame and its mechanism.

This assembly is then guided in movement by a lower rail and an upper rail, which are an integral part of the cockpit structure. For this purpose, the window mechanism is linked to the bottom of these rails by way of at least three rollers. Each of these rollers, completed by a set of rollers linked to the internal rims of the rails, is carried by a carriage forming a bogie.

However, it is observed not only that the adjustment of these bogies is complex, this task being time-consuming, but also that these bogies show relatively rapid wear, necessitating maintenance interventions by qualified operators, which operations are costly.

Furthermore, this mechanism is provided with two hangers placed above the upper post of the rigid frame of the pane, and two other hangers connected to the bogies moving in the lower rail. These hangers make it possible to absorb the high-energy impact of a bird strike on the window by transferring the forces created by this strike to the surrounding structure of the cockpit. The opening assembly is also maintained in closed position by virtue of an interference principle of the supports of the bogies.

This interference principle is indispensable to proper operation of the opening assembly. In fact, in addition to this function of maintaining the opening assembly in closed position, it constitutes an additional safety factor in the event of a bird strike. Under the effect of a strike, extra locking of the opening assembly is achieved, the opening assembly then having a tendency to become locked rather than unlocked.

Nevertheless, this interference principle has disadvantages, especially in terms of adjustments (clearances, compression of the seal of the periphery of the opening assembly, etc.).

It is also observed that the rear post of the rigid frame of the window has been considerably thickened by reason of the position of the hangers, in order to be able to withstand the impact of a bird strike.

This system for immobilization of the opening assembly, because of the number of parts that it requires and the resulting thickening of the movable frame, can therefore be improved as regards the total weight of the window equipped therewith.

During release of the opening assembly, a first translational movement of this assembly caused by the rotation of the handle is achieved by virtue of a conrod drive system and a universal transmission in the upper part of the opening assembly.

It is certainly known that these universal joints, which assure the mechanical transmission, have several disadvantages, especially in terms of space requirement and weight.

The present invention aims to address these diverse disadvantages by proposing an aircraft cockpit window wherein the novel design makes it possible to solve the technical problems caused by the prior art windows.

Consequently, the invention aims at an opening window for the cockpit of an aircraft, simple in its design and in its mode of operation, robust and having a smaller space inside requirement while assuring a significant reduction in weight compared with prior art cockpit opening windows.

It also permits manual opening in less than ten seconds for use as an emergency exit, without assistance from any other energy source, such as pyrotechnics. Finally, this window withstands bird strikes.

SUMMARY

For this purpose, the invention relates to an aircraft opening window comprising at least one pane equipped with a movable frame, the assembly comprising the said movable frame and the pane being movable relative to a fixed frame, an element for maneuvering the said movable assembly, a device for locking/unlocking and opening/closing the said movable assembly actuated by the said maneuvering element and means for guiding and supporting the said movable assembly.

According to the invention, the said fixed frame is provided with at least one housing for receiving a part at least of a first lateral rim of the said movable frame, the said part of the said first lateral rim becoming braced in the said housing, by means of which housing or housings the said first lateral rim is held in place when the window is in closed position, and the said part at least of the first lateral rim being received in the said housing, the guiding and supporting means of this movable assembly permits rotation of this assembly around an axis of rotation passing through the first lateral rim so as to place the other lateral rim of this movable frame in closed or released position.

Thus, during closing of the window, the movable assembly becomes lodged behind one or more fixed stops integral with the fixed frame, each forming a housing, then is locked on the rim opposite the first lateral rim. As a result, there no longer is a locking mechanism at this first lateral rim, thus making the window lighter and easier to adjust.

Preferably, the movable assembly becomes lodged behind several stops, each forming a housing.

In turn, opening of this window can advantageously remain traditional, since it can be achieved by retracting the movable assembly toward the rear.

In different particular embodiments of this aircraft opening window, each having its particular advantages and being capable of numerous possible technical combinations:

the first lateral rim being inclined, this axis of rotation is parallel to this first lateral rim to permit this latter to be received in the said at least one housing over its entire height.

By "inclination of the said first lateral rim" there is understood an inclination of this first lateral rim relative to a plane passing through the window sill.

the upper and lower parts of this first lateral rim being placed on the said axis of rotation, at least one of these parts comprises an extension arm of the movable frame.

Preferably, it is the lower part of this first lateral rim that is provided with the said extension arm of the movable frame.

Each of the said guiding and supporting means comprises a ball transfer unit placed at the end of a support element to assure the support function, this support being connected to the movable frame.

Advantageously, this support element is placed at the upper end of the movable frame on the side of its first lateral rim intended to be received in the housing of the fixed frame of the window associated therewith. A second support element is placed at the lower end of the same movable frame.

In addition, these support elements are each provided with a bearing roller placed in contact with a guiding element, preferably a rail, to assure the guiding function.

Preferably, the supporting and guiding assembly placed underneath the lateral rim of the movable frame opposite the one intended to be received in the said at least one housing of the fixed frame of the window is provided with an arm such as a lever, moveable in rotation and carrying at its end a roller intended to be braced against one flank of the lower rail to assure the opening movement of the window.

More generally, each supporting and guiding assembly comprises a bearing roller carried by a support element having a housing in which there is placed a ball transfer unit so that this ball transfer unit is at least partly placed projecting from this assembly.

Such a supporting and guiding assembly is therefore advantageously capable of being moved in several directions and of responding instantaneously when prompted to change inclination.

The support element of the ball transfer unit comprises an element for coupling this assembly to the movable assembly of the window.

The coupling element can be a simple linking axis.

Preferably, the opening/closing device comprises at least one blocking element placed solely on the lateral rim of the movable frame opposite the one intended to be received in the said at least one housing of the fixed frame, to immobilize the movable assembly in closed position.

By way of illustration, the opening/closing device comprises at least three blocking elements distributed over the lateral rim of the movable frame opposite the one intended to be received in the said at least one housing of the fixed frame.

Each of these blocking elements is provided with a movable arm having a planar slot intended to cooperate with a fixed stop placed on the said fixed frame to assure locking of the said movable assembly in closed position.

To achieve this, these blocking elements or locks, guided in translation in the movable frame, are advantageously equipped with a roller that rolls over the fixed stops of the fixed frame.

this fixed stop comprises at least one first slope and a second slope, the first slope assuring compression of the sealing element of the movable frame while the second slope is intended to lock the movable assembly even more securely in the event of a bird strike, the maneuvering element is provided with a single handle permitting movement, driving in rotation and actuation of the opening/closing device, the said handle being articulated, this handle is connected to a mechanism whose end sequentially actuates two superposed disengaging cams, on the one hand to assure locking/unlocking then on the other hand to assure the opening/closing movement of the window, this locking/unlocking/opening/closing device comprising blocking elements (or locks) placed on the other lateral rim of this movable frame, the cam driving the locking/unlocking mechanism is connected to at least some of these blocking elements by a pull and push cable (which makes it possible to avoid the use of universal joint links such as employed in the prior art), the housings comprise at least three fixed stops, each of these stops comprising means for adjusting the clearance between the corresponding stop and the movable frame.

BRIEF DESCRIPTION OF THE DRAWINGS

The invention also relates to an aircraft comprising a cockpit. Preferably, this cockpit is provided with at least one aircraft window such as described in the foregoing.

In different possible embodiments of this aircraft cockpit opening window, the invention will be described in more detail with reference to the attached drawings, wherein:

FIG. 8 shows the main steps of operation of the superposed disengaging cams, on the one hand to assure unlocking or locking of the locking/unlocking device of the said movable assembly then on the other hand to assure the opening or closing movement of the said window of FIG. 1, FIG. 8 a) shows the movable assembly in closed and locked position, FIG. 8 b) shows the movable assembly in closed and unlocked position and FIG. 8 c) shows the movable assembly in open and unlocked position.

FIG. 9 shows the main steps of opening/closing of the window of FIG. 1 with comparison of partial and enlarged views of the corresponding movement of the superposed disengaging cams and of the supporting and guiding assembly in the lower guide rail, FIG. 9 a) shows the window in closed and locked position, FIG. 9 b) shows the window in closed and unlocked position, FIG. 9 c) shows the window in released position and FIG. 9 d) shows the window in open position.

DETAILED DESCRIPTION

Figure 1:
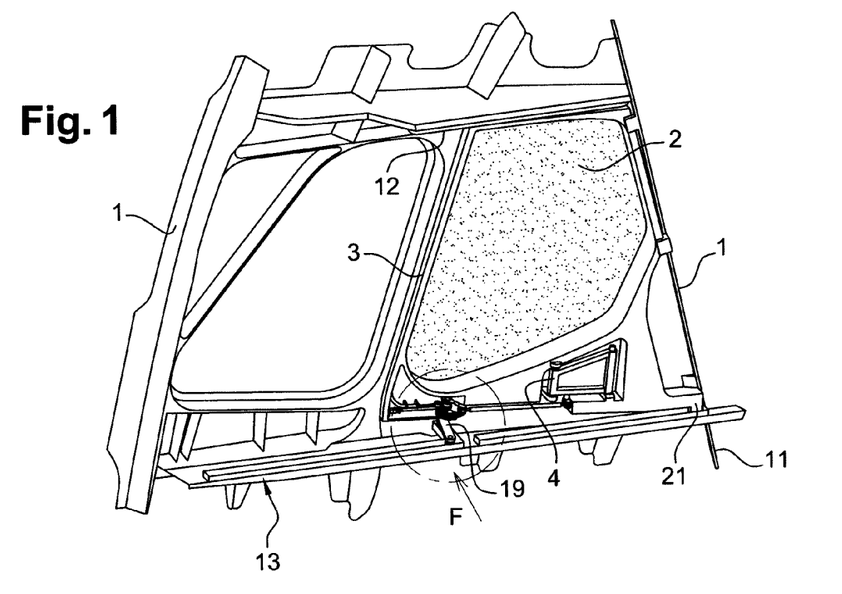
FIG. 1 schematically shows an aircraft window according to a particular embodiment of the invention.

FIG. 1 shows an aircraft window according to a preferred embodiment of the invention. This window comprises a fixed frame 1 as well as a pane 2 equipped with a movable frame 3. In traditional manner, this pane 2 and its movable frame 3 form a movable assembly intended to be manipulated by a crew member situated inside the cockpit.

For maneuvering this movable assembly, the crew member has a single handle 4, which is articulated.

Movable frame 3 of the window cooperates with fixed frame 1 via three-point links assuring an isostatic link between this movable frame 3 and fixed frame 1.

Guiding and supporting means permit opening of the window by release of the movable assembly from its closed position, followed by sliding of the movable assembly toward the rear.

Figure 2:
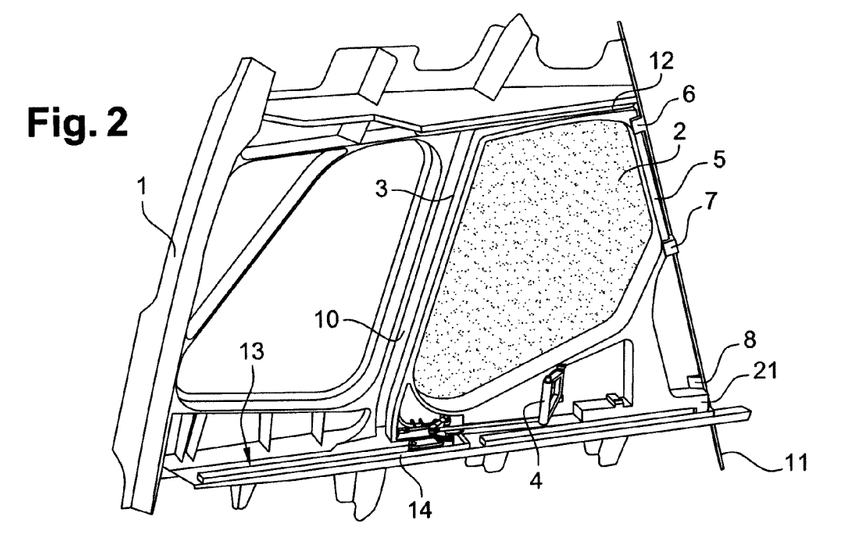
FIG. 2 shows the window of FIG. 1 in released position.

FIG. 2 shows the window in such a released position. First lateral rim 5, which in this case is the front lateral rim of movable frame 3, is received in three housings formed by three fixed stops 6, 7, 8 integral with fixed frame 1, while the other lateral rim 9 of this movable frame 3, in this case the rear lateral rim, is placed at a distance from opening 10 bounded by fixed frame 1.

The movement of the movable assembly from the released position to the closed position and vice versa is achieved by rotation of this assembly around an axis of rotation 11 passing through front lateral rim 5 of movable frame 3 received in these housings.

Front lateral rim 5 of movable frame 3 being inclined, axis of rotation 11 is parallel with this front lateral rim to permit it to be received in the housings formed by the three fixed stops 6, 7, 8 over its entire height. Movable frame 3 is provided in its lower part with an extension arm 21, permitting front lateral rim 5 of this movable frame 3 to be placed on this inclined axis of rotation 11.

Preferably, each stop 6, 7, 8 comprises means of adjusting the clearance (not shown) between each of stops 6, 7, 8 and movable frame 3, in order to assure that front lateral rim 5 of the frame is maintained in position in the event of a bird strike.

As can be seen in FIGS. 1 and 3 to 5, the guiding and supporting means comprise an upper rail 12 and a lower rail 13, which are integral with fixed frame 1. Each of these upper and lower rails 12 and 13 comprises a bottom and two flanks, the rail therefore having a channel-shaped cross section.

Figure 4:
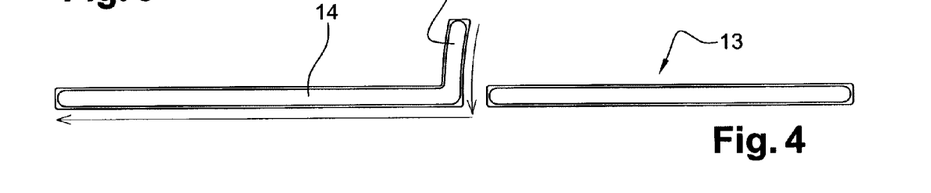
FIG. 4 is an overhead view of the lower guiding rail of the window of FIG. 1.

Lower rail 13 comprises a primary rail portion 14 and a secondary rail portion 15 in communication with this primary rail portion 14.

Rear lateral rim 9 of movable frame 3, or in other words the rim directed toward the rear of the aircraft, executes a rotational movement between the closed position and the released position. This secondary rail portion 15 is inclined relative to primary rail portion 14 and has the shape of a portion of a circle (FIG. 4).

Each of the guiding and supporting means also comprises a ball transfer unit 16 (FIG. 3) placed at the end of a support element 17, which itself is connected to the movable assembly. Preferably, this support element 17 comprises a primary body and a secondary body integral with this primary body while being movable in translation relative to this primary body, so that the position of this secondary body relative to the primary body can be varied so as to adjust the position of the movable assembly relative to the bottom of each rail.

Figure 3:
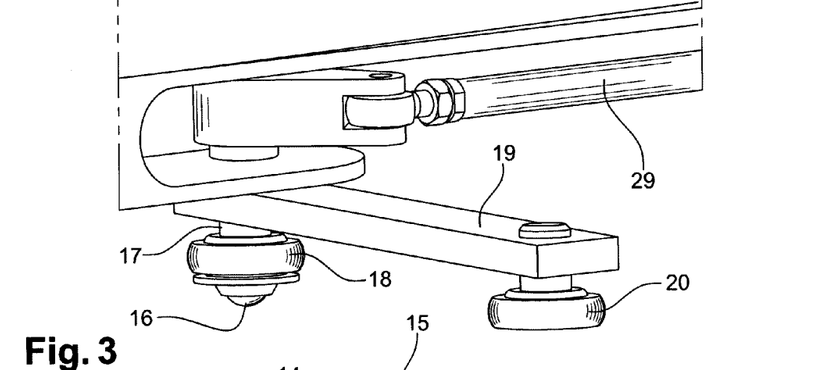
FIG. 3 is a partial and enlarged view according to Arrow F of the movable assembly of FIG. 1, showing a supporting and guiding assembly provided with an arm moveable in rotation to create the opening movement of the movable frame.

Each ball transfer unit 16 is movable in rotation at the end of this support element 17, thus advantageously permitting this ball transfer unit to roll in several directions. In this way a single ball transfer unit permits passage from curved secondary rail portion 15 to primary rail portion 14 having a different direction.

Each supporting and guiding assembly is additionally provided with a bearing roller 18 to assure lateral guidance of the ball transfer unit in the corresponding lower and upper rails 13 and 12.

A ball transfer unit 16 is placed at the upper and lower ends of movable frame 3 on the side of lateral rim 5, directed toward the front of the aircraft, of this movable frame 3, these ball transfer units 16 making it possible to move the movable assembly in rotation.

The support element of each ball transfer unit is, for example, made of galvanized steel, the ball transfer units being of stainless steel and the bearing rollers 18 of steel.

Figure 5:
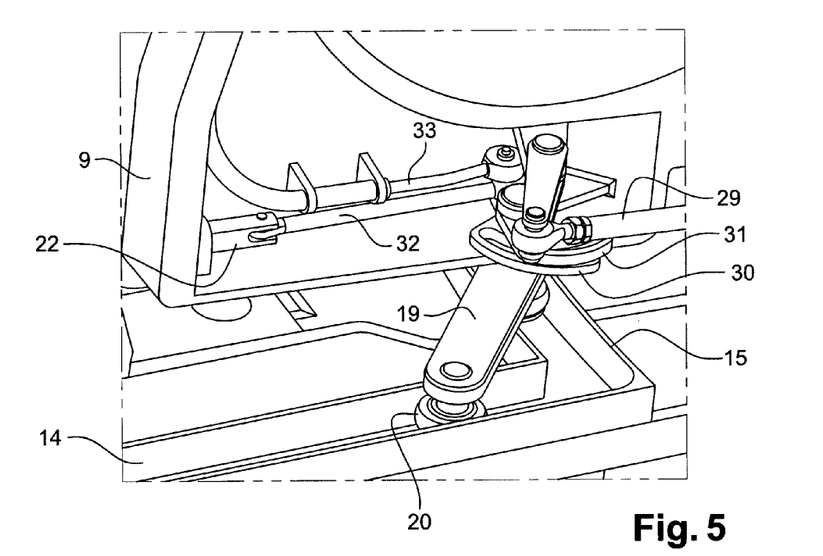
FIG. 5 is a partial and enlarged view of the lower guiding rail and of the rear lower post of the movable assembly of FIG. 1, showing the movement of the supporting and guiding assembly of FIG. 3 during release of the window.

One of these support elements 17 has been positioned directly underneath the movable assembly in order to directly support the force of the weight of the assembly. More precisely, this supporting and guiding assembly is placed at the rear lateral rim 9 of movable frame 3. This supporting and guiding assembly additionally comprises a lever 19, this lever being movable in rotation in a plane parallel to the window sill. At the end of lever 19, a simple bearing roller 20 is sufficient to create the opening/closing movement of the opening/closing device of the window, by being braced against the flanks of lower rail 13.

The flanks of upper and lower rails 12 and 13 are spaced by a distance larger than the diameter of rollers 18 surrounding support elements 17. Since ball transfer units 16 are in point contact with the bottom of these rails 12, 13, this bottom is advantageously provided with a protective surface lining. It thus will be possible to harden this bottom, for example, by ceramizing.

Figure 6:
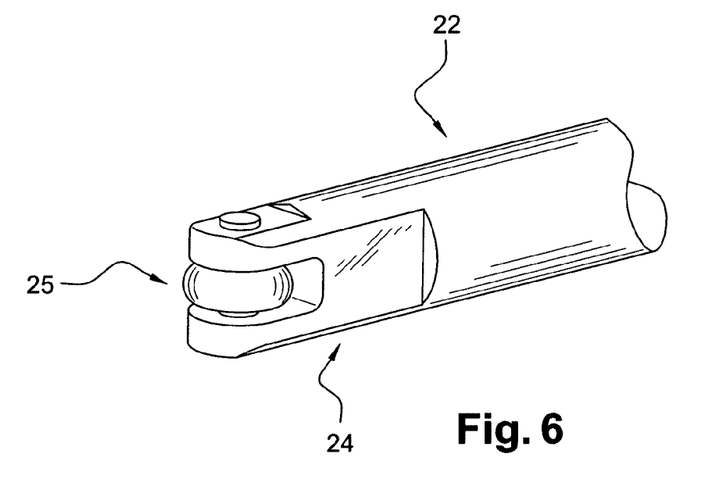
FIG. 6 is a partial and perspective view of a lock placed on the rear lateral rim of the movable frame of FIG. 1.

The window is also provided with a device for locking/unlocking the movable assembly, comprising three blocking elements 22 or locks, placed solely on rear lateral rim 9 of movable frame 3 to lock the movable assembly in closed position.

With such a number of blocking elements 22 and their positioning on the rear lateral post of movable frame 3, it is advantageously possible to significantly reduce the thickness of this rear lateral post while assuring that the window can withstand bird strikes.

Each blocking element 22 is provided with a movable arm cooperating with a corresponding fixed stop 23 placed on fixed frame 1 to assure locking of the movable assembly in closed position.

Each movable arm is provided with a plane part 24 and is equipped with a roller 25 at its end. Thus, merely by a translational movement, each blocking element 22 comes to roll over fixed stop 23.

Figure 7:
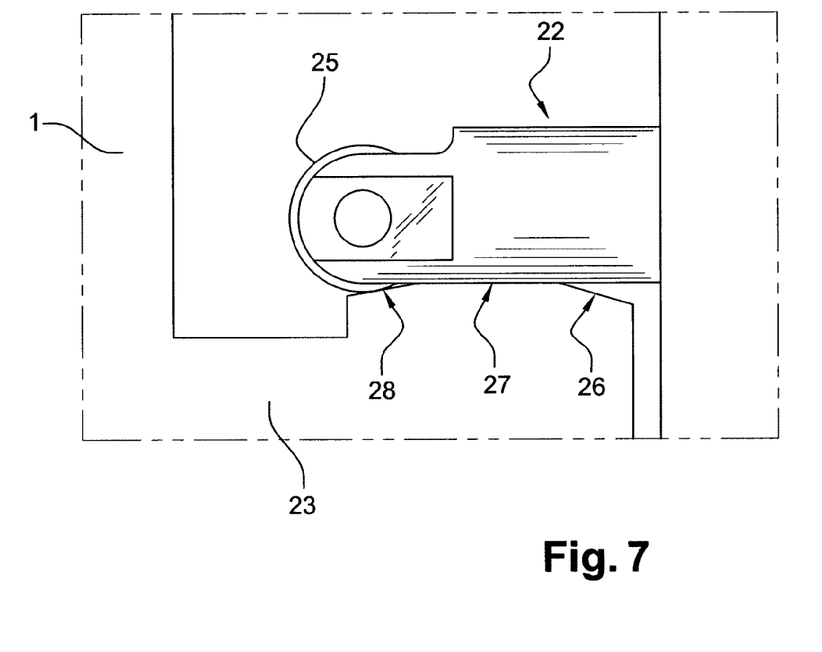
FIG. 7 shows the movement of the lock of FIG. 6 for immobilizing the movable assembly in locked position.

On its part that comes into contact with roller 25 of the blocking element or lock 22, fixed stop 23 is provided successively with a first slope 26, a flat 27 and a second slope 28.

The shape of fixed stop 23 advantageously makes it possible to regain the two functions assured by the interference principle of prior art windows.

First slope 26 encountered by roller 25 assures compression of the seal (not shown), while second slope 28 prevents unlocking of the movable assembly in the event of a bird strike. This second slope 28 also permits plane part 24 of the lock to bear directly on fixed stop 23: the bird strike is absorbed not by the spindle of the roller but instead by plane part 24 of blocking element 22, which then has the function of a stop.

At the maneuvering element of the movable assembly, and in order to lessen the force due to the reaction of the seal of movable frame 3 during its compression, the seal will preferably be a "self-inflating" seal. This seal is perforated over its entire periphery, thus making it possible to reduce the reaction force considerably while assuring leaktightness (30% compression).

Figure 8A:
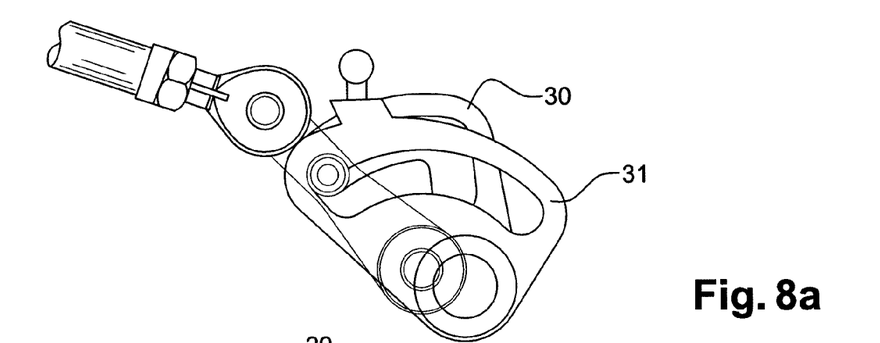
Figure 8B:
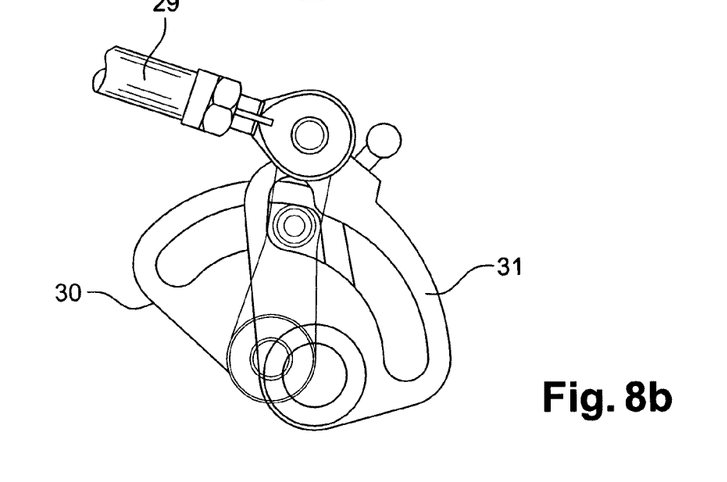
Figure 8C:
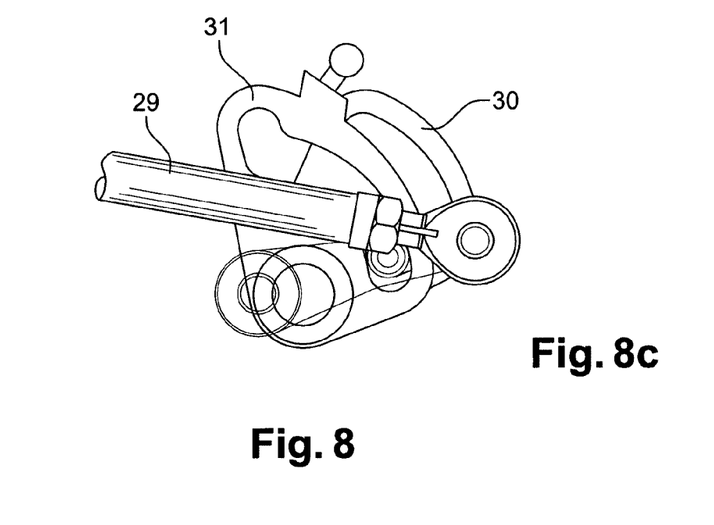

The operation of locks 22 placed on rear lateral rim 9 of movable frame 3 is achieved by actuation of handle 4 connected by a lever 29 to two superposed disengaging cams 30, 31.

Figures 9, 9D:
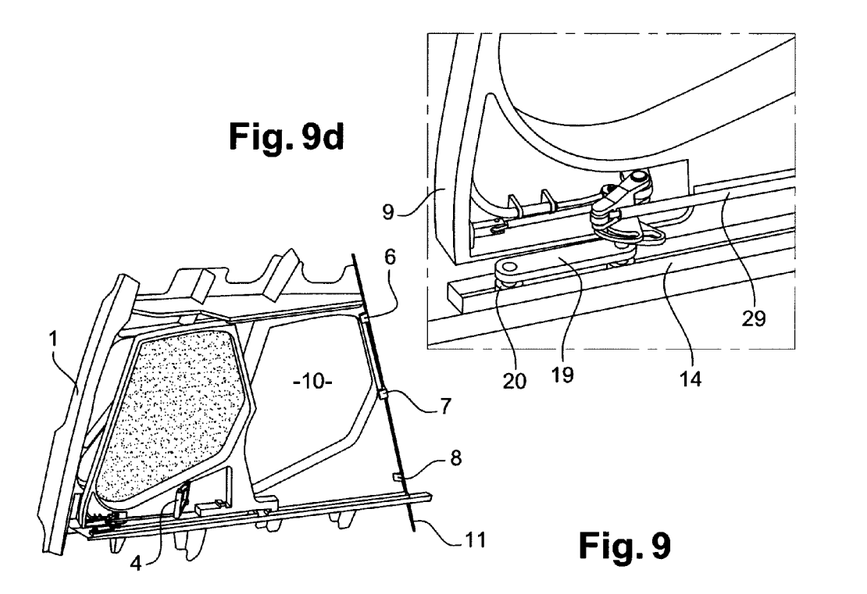
Figure 9A:
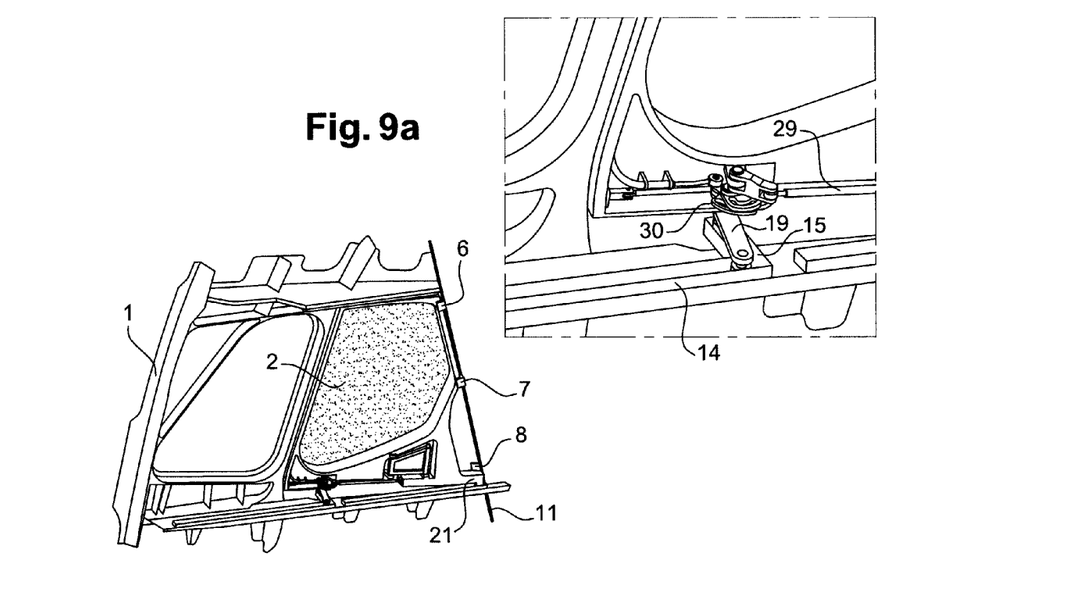
Figure 9B:
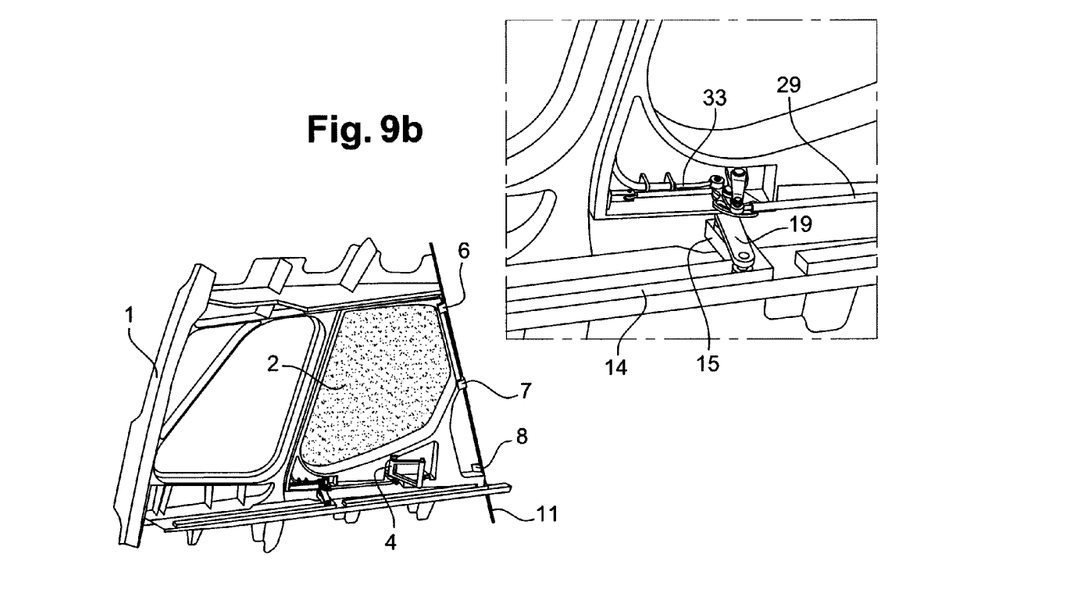
Figure 9C:
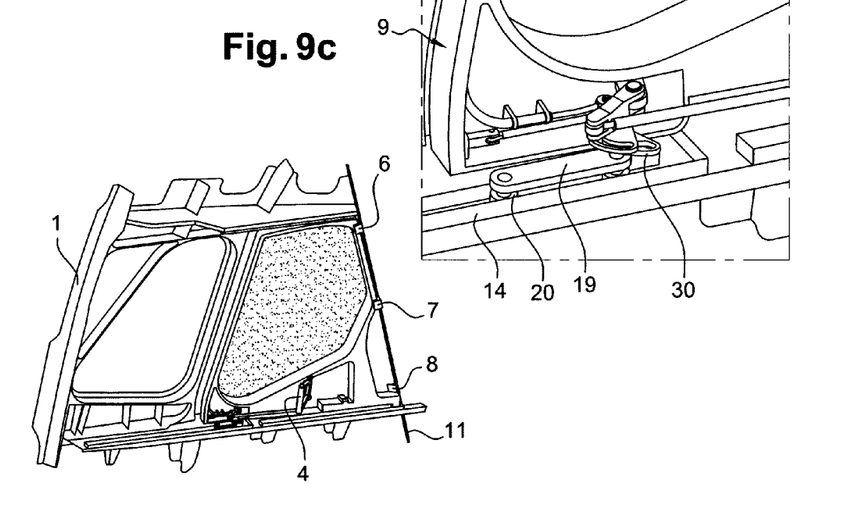

During the first 45 degrees of rotation of maneuvering handle 4, locks 22 are actuated by disengaging cam 31, then, for the following 90 degrees of rotation of maneuvering handle 4, the other disengaging cam 30 brings about release of the movable assembly.

Consequently, unlocking, then release of the movable assembly are achieved at 135° of rotation of handle 4.

Since lock 22 placed in the lower part of rear lateral rim 9 is advantageously driven by disengaging cam 31 by means of a rod 32, lock 22 placed in the upper part thereof is in turn operated by a pull and push cable 33 (commonly referred to as a ball control, or in English as a "push pull cable"), so that the movement of the lock of the lower part brings about that of the lock of the upper part.

A linking piece (not shown) between lock 22 of the upper part of rear lateral rim 9 and pull and push cable 33 makes it possible to add intermediate lock 22. This linking piece is accurately guided in translation on mobile frame 3.

The invention claimed is:

1. An aircraft window which can be opened, comprising:
    a movable assembly that is movable relative to a fixed frame, the movable assembly including
        at least one pane, and
        a movable frame framing the at least one pane;
    a maneuvering element for maneuvering the movable assembly;
    a device for opening/closing and locking/unlocking the movable assembly, the device being actuated by the maneuvering element; and
    a support unit that guides and supports the movable assembly,
    wherein the fixed frame includes at least one housing for receiving a part of a first lateral rim of the movable frame, the part of the first lateral rim being supported and held in place in the at least one housing when the aircraft window is in a closed position,
    wherein when the part of the first lateral rim is disposed in the at least one housing, the support unit permits rotation of the movable assembly around an axis of rotation passing through the first lateral rim such that a second lateral rim of the movable frame that is opposite the first lateral rim is movable between a closed position and a disengaged position,
    wherein the support unit includes
        a support element connected to the movable assembly,
        a bearing roller disposed to rotate around the support element, and
        a ball transfer unit disposed at an end of the support element, the ball transfer unit supporting the movable assembly, and
    wherein the support element, the device, and the maneuvering element are interconnected via linkage members, such that, when the window is in the closed position, actuation of the maneuvering element simultaneously actuates the device to unlock the window and induces the support element of the support unit to move so as to place the window in the disengaged position.

2. The window according to claim 1, wherein the first lateral rim is inclined relative to a plane passing through a window sill, and the axis of rotation is parallel to the first lateral rim to permit the first lateral rim to be received in the at least one housing over an entire height of the first lateral rim.

3. The window according to claim 2, wherein, in the closed position, upper and lower parts of the first lateral rim are located on the axis of rotation, and
    wherein at least one of the upper and lower parts includes an extension arm of the movable frame.

4. The window according to claim 1, wherein the bearing roller is in contact with a guiding element which guides the movable assembly during a window opening operation.

5. The window according to claim 1, wherein support unit further includes an upper rail and a lower rail, the lower rail including a primary rail portion in communication with a secondary rail portion and the secondary rail portion being inclined relative to the primary rail portion and having a curved shape to permit rotation of the movable assembly between the closed position and the disengaged position.

6. The window according to claim 1, wherein the device includes at least one blocking element disposed on the second lateral rim of the movable frame to immobilize the movable assembly when the window is in the closed position.

7. The window according to claim 6, wherein the at least one blocking element is provided with a movable arm having a planar slot which cooperates with a fixed stop placed on the fixed frame to assure locking of the movable assembly in the closed position.

8. The window according to claim 7, wherein the fixed stop includes at least one first slope and a second slope, the first slope assuring that the movable frame is sealed, and the second slope preventing the movable assembly from unlocking in the event of an impact with a bird.

9. The window according to claim 1, wherein the maneuvering element includes a handle to permit actuation of the device and displacement of the window, and
    wherein the handle is articulated.

10. The window according to claim 9, wherein the handle is connected to an end of an arm, the end sequentially actuating two superposed disengaging cams, to perform locking/unlocking and opening or closing movement of the window.

11. The window according to claim 10, wherein the device includes blocking elements placed on the second lateral rim of the movable frame, and
    wherein one of the cams assure the locking/unlocking of the device and is connected to at least one blocking element by a pull and push cable.

12. The window according to claim 1, wherein the at least one housing includes at least three fixed stops, each of the fixed stops including means for adjusting clearance between the respective fixed stop and the movable frame.

13. An aircraft cockpit comprising at least one window according to claim 1.

14. An aircraft comprising a cockpit, wherein the cockpit includes at least one window according to claim 1.

* * * * *